UNITED STATES PATENT OFFICE.

ASBERRY SINGLETON, OF RICHLAND, IOWA.

GUNPOWDER AND PROCESS OF MAKING SAME.

SPECIFICATION forming part of Letters Patent No. 610,417, dated September 6, 1898.

Application filed April 24, 1897. Serial No. 633,733. (No specimens.)

*To all whom it may concern:*

Be it known that I, ASBERRY SINGLETON, a citizen of the United States, residing at Richland, in the county of Keokuk and State of Iowa, have invented a new and useful Improvement in Gunpowder and Processes of Manufacturing the Same, of which the following is a specification.

The object of my invention is to provide a gunpowder that is easy to manufacture and cheap, the powder at the same time having great strength when exploded and being smokeless.

My composition consists of the following ingredients combined in the proportions stated, viz: wood-dust, sixty parts; chlorate of potash, twenty parts; granulated sugar, eighteen parts; paraffin, two parts; total, one hundred parts.

The composition is prepared in the following manner: Take soft wood (basswood, preferably) cut into sawdust, then grind the sawdust into fine dust, dissolve the chlorate of potash by boiling in water, then add the paraffin and sugar. After the sugar is dissolved and the paraffin melted stir in the wood-dust and boil down to a thick pulp. Then grain with any suitable device for that purpose and dry in the usual way.

Having thus described my invention, what I claim as new, and desire to secure by Letters Patent, is—

1. A powder consisting of wood-dust, chlorate of potash, sugar, and paraffin put together in substantially the quantities specified.

2. A process for making powder consisting of first cutting soft wood into sawdust, then grinding said sawdust into a powder, then dissolving chlorate of potash in boiling water, then adding to the chlorate and water sugar and paraffin, dissolving the said sugar and melting the paraffin, then adding the powder from the wood-dust and boiling down to a thick pulp, then graining and drying by any suitable means.

ASBERRY SINGLETON.

Witnesses:
IDA M. SINGLETON,
ADDIE MILLS.